United States Patent

[11] 3,602,473

| [72] | Inventors | Martin Antoon Van Riet;<br>Franciscus Antonius Wilhelmus Vlijmen,<br>both of Emmasingel, Eindhover,<br>Netherlands |
|---|---|---|
| [21] | Appl. No. | 10,484 |
| [22] | Filed | Feb. 11, 1970 |
| [45] | Patented | Aug. 31, 1971 |
| [73] | Assignee | U.S. Philips Corporation<br>New York, N.Y. |
| [32] | Priority | Feb. 13, 1969 |
| [33] | | Netherlands |
| [31] | | 6,902,238 |

[54] SUSPENSION DEVICE
3 Claims, 4 Drawing Figs.

[52] U.S. Cl. .................................................... 248/317,
52/484, 287/189.35

[51] Int. Cl. ..................................................... E04b 5/00
[50] Field of Search ......................................... 248/317,
323, 327; 287/189.35; 52/484, 485, 486, 144, 489,
495, 49

[56] References Cited
UNITED STATES PATENTS
2,924,856  2/1960  Price ........................... 52/484 X
FOREIGN PATENTS
666,936  7/1965  Belgium ...................... 52/484
690,360  3/1940  Germany..................... 287/189.35

Primary Examiner—J. Franklin Foss
Attorney—Frank R. Trifari

ABSTRACT: A suspension device for supporting a profiled rod of U-shaped section having a rotatable arm which is provided with a Z-shaped coupling member at one end. The arm can be directly inserted into the slot of the profiled rod and can be brought into a locked position by rotating the arm.

3,602,473

INVENTORS
MARTIN A. VAN RIET
FRANCISCUS A.W. VAN VLIJMEN

AGENT

SUSPENSION DEVICE

The invention relates to a suspension device for supporting a profiled rod of U-shaped section which may form part of a frame for a false ceiling. The device has a coupling member which can be secured between the sidewalls of the rod which define a slot and are provided with an inwardly directed flange.

A suspension device for profiled rods is known in which a few separate components are secured together by means of a screw connection and are clamped to the profile rod. In such a device a coupling member, which is intended to slide in the slot of the profiled rod has to be inserted from one end of the rod into the slot; the mounting of such a suspension device is very time consuming.

It is the object of the invention to provide an inexpensive suspension device without screws which has fewer simple components and which can be mounted in a simple manner and in a very short period of time without any tools.

For that purpose, the suspension device according to the invention comprises a suspension arm which can be rotated relative to the rod and has a coupling member at one end thereof. The coupling member can be directly inserted into the slot between the flanges when the arm is held in one rotated position and can then be moved to a locked position by rotating the arm. In the locked position the flanges partly overhang the coupling member. The coupling member can be inserted into the slot at any position of the profiled rod. The suspension arm and the coupling member form one assembly, and the coupling member can be moved to the locked position by simply rotating the suspension arm manually without requiring the use of any tools.

Locking of the suspension device is easily achieved because the coupling member when in the locked position, is clamped between the sidewalls of the rod.

In a preferred embodiment the coupling member, viewed in the direction in which it is inserted in the profiled rod, has a Z-shaped section and two parallel end faces cooperating with the sidewalls of the profiled rod.

In order to easily and inexpensively manufacture the invention, the suspension arm and coupling member are made from a single T-shaped strip of sheet material. The strip has a recess at the height of the flanges, the width of which is smaller than the distance between the flanges. Two parallel parts from the crossbar of the T-shape are bent out of the plane of the strip on either side.

Unlocking of the coupling member under unfavorable conditions, for example, by vibrations, is prevented by a lock which is slidable over the arm and is formed as a plate having a central aperture and a lug bent out of the plane of the plate. The lug, in the position adjacent the profiled rod, is clamped with its two parallel sidewalls between one of the end faces of the coupling member and one of the flanges of the profiled rod.

In order that the invention may be readily carried into effect, one embodiment thereof will now be described in greater detail, by way of example, with reference to the accompanying drawings, in which FIG. 1 is a perspective view of the embodiment in the mounted position;

Figure 1:
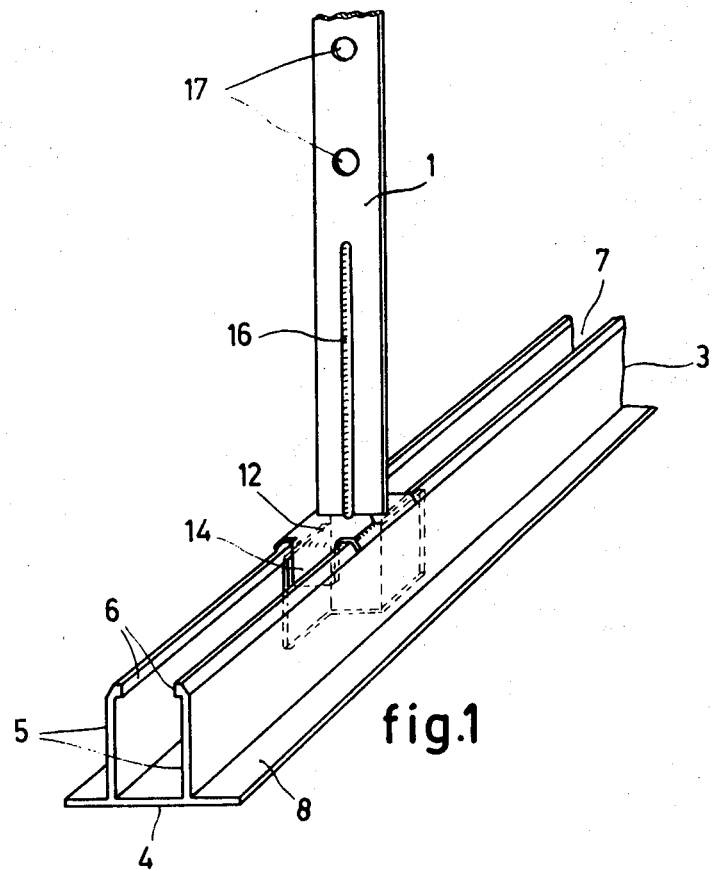
Figure 3:
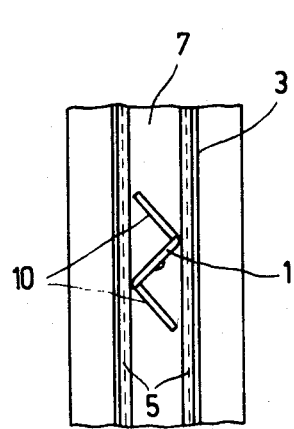
FIG. 3 shows the coupling member viewed in the rotated position and the direction in which it is inserted into the profiled rod.
Figure 4:
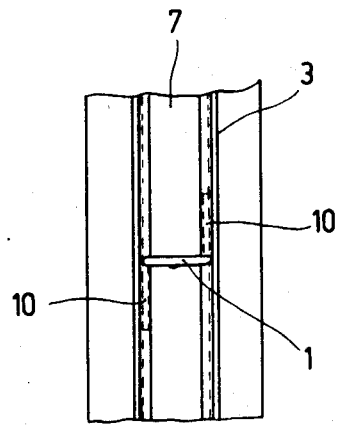
FIG. 4 shows the coupling member in the locked position.
Figure 2:
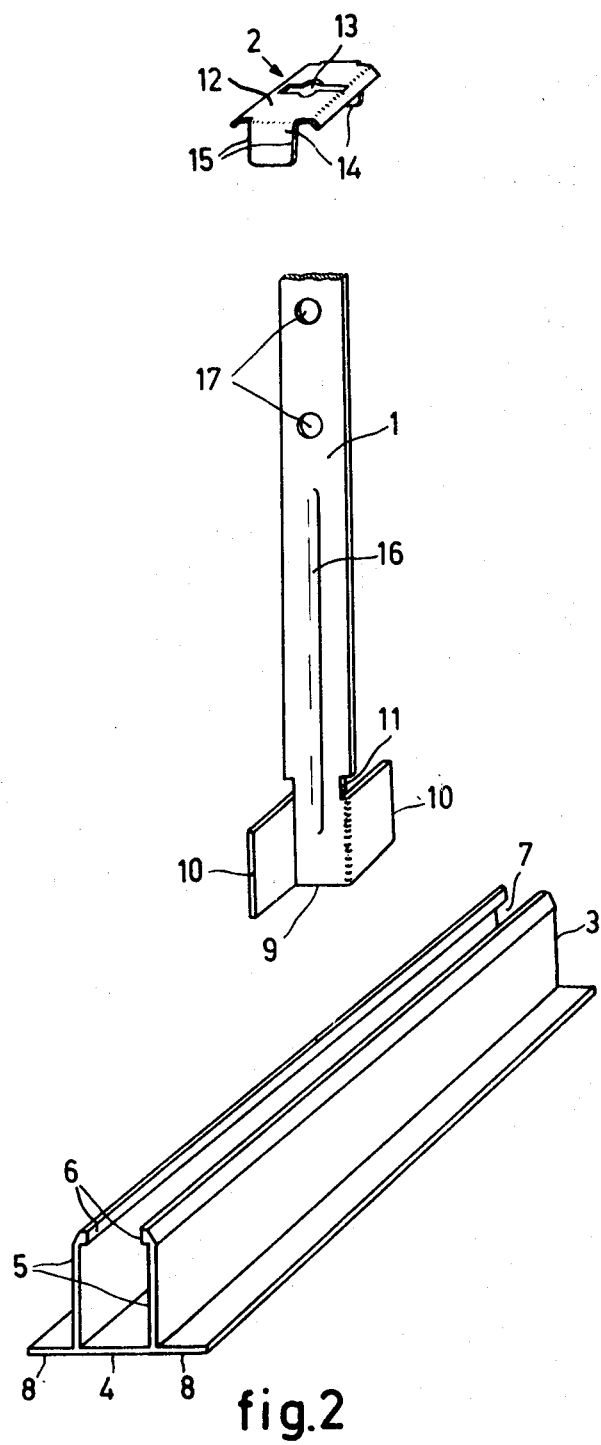
FIG. 2 is an exploded view of the embodiment.

The solution according to the invention consists of a suspension arm 1, a lock 2 and the profiled rod 3 to be suspended which may form part, for example, of a frame for a false ceiling. The profiled rod 3 has a U-shaped section with a bottom 4 and two sidewalls 5, the free ends of which are provided with an inwardly directed flange 6. The bottom 4 together with the sidewalls 5 and the flanges 6 form a slot 7. The profiled rod 3 may be provided on either side of the bottom 4 with supporting edges 8 for ceiling slabs of the like.

The suspension arm 1 is provided at one end with a coupling member 9 which is to be inserted into the slot 7 and which, viewed in the direction in which it is inserted in the slot 7, has a Z-shaped profile with two end faces 10. The coupling member has such dimensions that the smallest width is smaller than the distance between the two flanges 6 so that in a given rotated position of the suspension arm 1 relative to the profiled rod 3 it can be inserted directly into the slot 7 between the flanges 6 and be brought into the locked position by manually rotating the suspension arm 1. In this locked position the flanges 6 partly overhang the coupling member 9 and the end faces 10 engage the sidewalls 5 of the profiled rod 3. This coupling member can be proportioned so that upon rotating the suspension arm 1 to the locked position a certain resistance has to be overcome.

The suspension arm 1 together with the coupling member 9 is manufactured from a T-shaped strip of sheet material in which the coupling member is obtained by two parts bent out of the plane of the strip and forming the end faces 10; at the height of the flanges 6 and adjoining the coupling member 9 the suspension arm has a recess 11, the width of which is smaller than the distance between the flanges 6 and the height of which is larger than the height of the flanges so as to enable the rotation of the suspension arm 1 when the coupling member 9 is inserted into the slot 7.

In unfavorable circumstances, for example, in the case of a ceiling which is subject to vibrations, undesirable unlocking of the suspension is prevented by the lock 2 which is formed as a plate 12 having a central aperture 13 and two lugs 14 bent out of the plane of the plate, the aperture 13 having such dimensions that the lock 2 can be slid onto the suspension arm 1 in the direction of the profiled rod 3. In the locked position of the coupling member 9 the lock 2 is forced against the profiled rod 3. The lugs 14 are inserted with their parallel side faces 15 between the two flanges 6 of the profiled rod 3, the lugs pressing with one of the side faces 15 against one of the end faces 10 of the coupling member 9 and with the other side face against one of the flanges 6.

If it should be deemed necessary, the suspension arm 1 may be provided with a reinforcing rib 16 and be suspended by means of one or more apertures 17 in cooperation with a hook or similar elements. The end of the arm may itself be constructed as a hook. It is obvious that the coupling member 9 and the straight portion of the suspension arm 1 can be manufactured separately and be combined to form one assembly, for example, by welding. In the embodiment described the coupling member 9 has a Z-shaped profile with two end faces 10: S-shaped or similar profiles are to be understood to be included in said embodiment; a clamping effect can also be obtained by means of curved surfaces which operate in the manner of an eccentric.

The profiled rod to be suspended need not comprise a closed bottom 4 but may also be composed of two separate elements on the condition that the profile thus obtained has two parallel sidewalls with inwardly directed flanges.

What is claimed is:

1. A suspension device for supporting a channel of substantially U-shaped section, said channel having two legs with inwardly projecting flanges at the free ends of said legs, said device comprising an arm, a coupling member attached to one end of said arm, said coupling member comprising a pair of parallel extending end faces and a cross face connecting said end faces thereby forming a substantially Z-shaped cross section, said arm and said coupling member being formed of a single T-shaped strip of sheet material, a recess between said arm and said coupling member the width of which is smaller than the distance between said flanges so that when said coupling member is inserted into said channel and rotated at least one of said end faces will engage a leg of said channel and said flange will be in cooperative engagement with said recess overhanging said end faces so that said coupling member will be securely held within said channel, and a lock which can be slid over the arm formed as a plate having a central aperture and a lug bent out of the plane of the plate, said lug, when adjacent the profiled rod, being clamped with its two parallel sidewalls between one of the end faces of the coupling member and one of the flanges of the profiled rod.

2. A suspension device for supporting therefrom a U-shaped rod comprising, an arm formed of a flat piece of sheet material, a pair of end flaps attached to one end of said arm extending in opposite parallel directions and substantially perpendicular to the plane of said arm, so that when said arm is inserted into said rod between the legs of said U-shape and rotated said flaps will engage the inside surfaces of said legs, said legs having flanges overhanging said flaps so that said arm is securely held between the legs of said U-shape, and a locking member comprising a flat plate having a slit-shaped aperture therein and means for extending into said U-shaped rod for engaging and locking said flaps between the legs thereof.

3. The device according to claim 2 wherein said means for extending into said rod comprises a pair of lugs attached to said plate and extending perpendicular to the plane in the same direction therefrom so that when said plate is slid onto the arm through said aperture, said lugs will extend into the rod between the legs of said U-shape and be engaged between one of said flaps and one of said legs so as to lock said flaps therein.